(No Model.)

J. R. KAUFMANN.
SEAT FOR VEHICLES.

No. 422,225. Patented Feb. 25, 1890.

Witnesses.

Inventor.
J. R. Kaufmann

UNITED STATES PATENT OFFICE.

JOHN R. KAUFMANN, OF WATERLOO, ONTARIO, CANADA.

SEAT FOR VEHICLES.

SPECIFICATION forming part of Letters Patent No. 422,225, dated February 25, 1890.

Application filed August 8, 1889. Serial No. 320,073. (No model.)

*To all whom it may concern:*

Be it known that I, JOHN R. KAUFMANN, carriage-builder, of the town of Waterloo, in the county of Waterloo, and in the Province of Ontario, Canada, have invented a certain new and useful Improvement in Seats for Road-Vehicles, of which the following is a specification.

The object of the invention is to so arrange the bottom and back of the seat as to relieve the occupant from the jolting caused by the vehicle passing over any obstruction; and it consists, essentially, in flexibly connecting the bottom and back of the seat to the body by means of hinges and springs arranged substantially as hereinafter more particularly explained.

Figure 1:
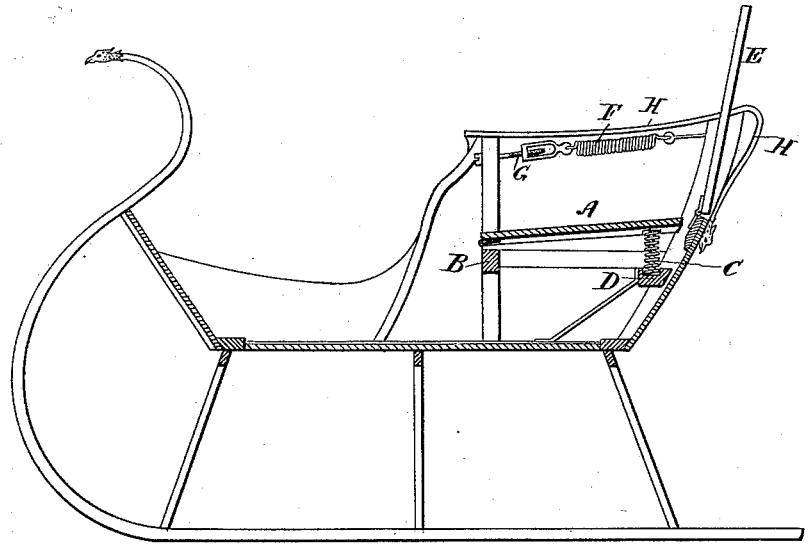
Figure 2:
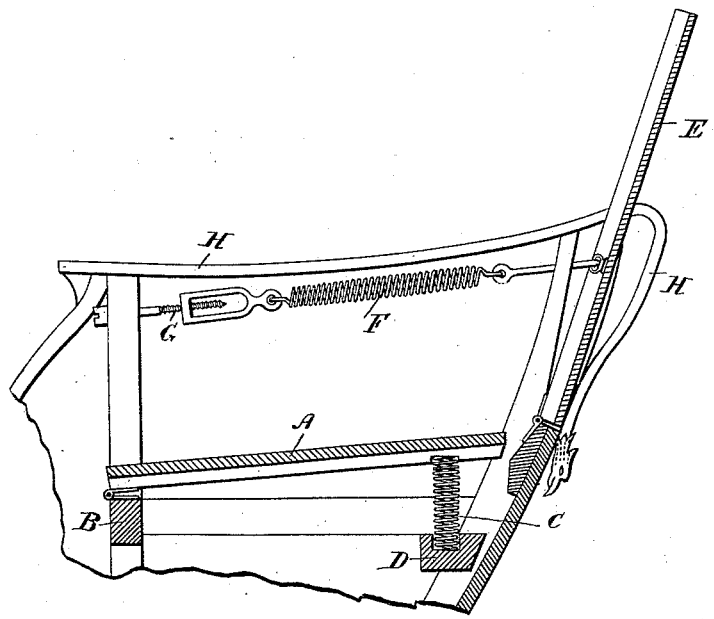

Figure 1 is a sectional elevation of a cutter provided with my improved seat. Fig. 2 is an enlarged section of my improved seat.

A represents the bottom of the seat hinged to the front rail B and supported at its back by a series of springs C, extending across the seat and fitting into sockets formed on the back rail D and bottom of the seat, as indicated.

E is the back of the seat, hinged to the body, as shown, and supported by the springs F, located, one on each side, immediately below the arms of the seat. Each spring F has an adjusting-screw G, by which its tension may be increased or decreased, as required, for the purpose of giving the back E the necessary elasticity.

Each arm H extends behind the back E, and is formed so as to constitute a stop to prevent the back being moved beyond a given distance.

What I claim as my invention is—

1. In a vehicle-seat, the combination of the back hinged to the seat, springs connected to the back and seat, and arms H, extending behind the back to act as stops, substantially as described.

2. In a vehicle-seat, the combination, with the hinged back E, of the springs F, each having one end connected with the back, adjusting-screws connected to the other ends of the springs and to the frame of the seat, and the arms H, extending behind the back to act as stops, all substantially as described and shown.

Waterloo, July 4, 1889.

JOHN R. KAUFMANN.

In presence of—
GEO. SUGGETT,
ERNEST W. HUNT.